Figure 1:
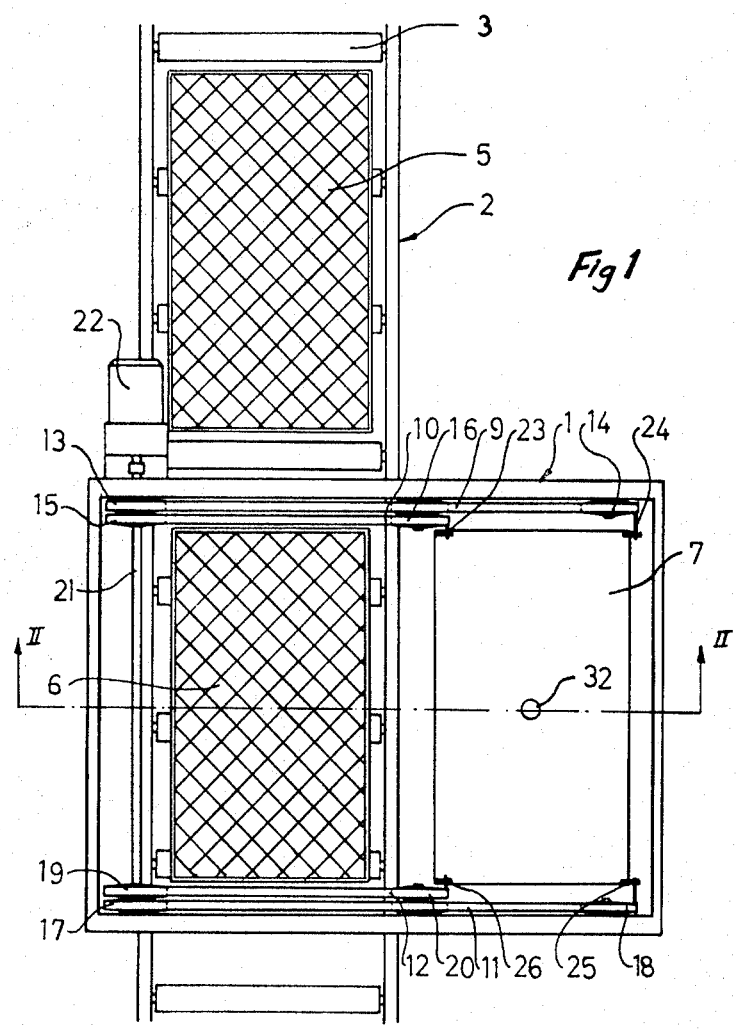

United States Patent [19]

Ovarnstrom

[11] 3,750,832

[45] Aug. 7, 1973

[54] SOWING MACHINE FOR DISPENSING SEEDS UNTO SEED BEDS

[76] Inventor: Bengt Gustav Lennart Ovarnstrom, Baltargatan 27, Borlange, Sweden

[22] Filed: Feb. 12, 1971

[21] Appl. No.: 114,807

[30] Foreign Application Priority Data
Feb. 16, 1970 Sweden............................ 1967/70

[52] U.S. Cl............................................ 221/211, 111/1
[51] Int. Cl............................ B65g 47/91, A01c 5/00
[58] Field of Search......................... 221/211; 111/1; 294/64, 65; 214/1 BS, 1 BT, 1 BH, 1 BV

[56] References Cited
UNITED STATES PATENTS

| | | | |
|---|---|---|---|
| 2,546,838 | 3/1951 | Tasche............................ | 221/211 X |
| 3,627,173 | 12/1971 | Kerker............................ | 221/211 |
| 2,455,701 | 12/1948 | Putman et al.................. | 214/1 BS |
| 1,532,255 | 4/1925 | Miller............................. | 214/1 BH |

Primary Examiner—Samuel F. Coleman
Assistant Examiner—Francis J. Bartuska
Attorney—Woodling, Krost, Granger & Rust

[57] ABSTRACT

The present disclosure has to do with the construction of seed lifters which are utilized in a device used in the mechanical sowing of a number of seeds which are distributed to a predetermined number of sowing places with a predetermined number of seeds per sowing place. Each of the seed lifters includes a suction nozzle having a plurality of spaced openings and each of the openings are operatively connected alternately to the suction side and the pressure side of an air compressor. The diameter of the openings is considerably less than the size of the seed to be planted and around the mouth of each one of the openings is provided an essentially plane field bounded by and forming angles to the adjacent plane or curved surfaces which slope away from the field. The largest dimension of the plane fields does not essentially surpass the size of the seed type in question. Other specific structural relationships of the suction nozzle are set forth in the disclosure.

3 Claims, 4 Drawing Figures

PATENTED AUG 7 1973

3,750,832

SHEET 2 OF 2

INVENTOR.
Bengt G. L. Qvarnstrom
BY
Woodling Krost Granger + Krost
Attys.

SOWING MACHINE FOR DISPENSING SEEDS UNTO SEED BEDS

The present invention deals with a device for simultaneous mechanical sowing of several seeds at predetermined sowing places distributed over a sowing surface with a predetermined number of seeds per sowing place. The device according to the invention is primarily developed for precision sowing of seeds of different size and shape, e.g., pine seeds, for which type of sowing there has been no satisfactory solution. The device is not limitted to this field of application only, but it can be modified within the basic idea of the invention to sowing of most seed types.

Planting requires each year a very large number of plants which have to be planted during a relatively short season and still reach a given suitable age. Therefore, in order to obtain the necessary number of plants of suitable age, a very large number of seeds each year have to be sown during a short period of time. The device according to the invention is well suited for this work due to its great capacity and reliable operation. Primarily it is intended for sowing seeds into separate plant boxes which may comprise so-called paper pots, i.e., a large number of pots of paper or carton joined to suitable units. Such a unit usually contains 300–400 pots. One variant of such pot unit is presented in the British Pat. publication 930 309. The device according to the invention is particularly well suited for sowing seeds into pot units of the type mentioned, since the location of each sowing place can then be determined in advance and also since it is possible in advance to determine the number of seeds per sowing place with consideration to the established sprouting ability of the used seed type. In using pot units of this kind it is important that not a larger number of seeds than necessary is sown into each pot. Namely, the intention is to allow the seeds to grow in their respective box until it is time for planting and separating the pots. Likewise it is desirable that only one plant per pot is produced, because in this way one may expect bigger and stronger plants to grow up during the time available before planting has to be carried out. However, it is likewise important that expensive hot-house and nursery-garden space is not occupied by empty pots and extremely important to be able to adjust the number of seeds per sowing place relative to the sprouting ability of different seed types. Excellent quality seeds of coniferous trees also mean high price, on account of which as low as possible seed consumption is desired. The device according to the invention is not restricted to be used entirely for coniferous seeds and neither to be used entirely for sowing into paper pots or comparable pot units. This is only an example of different possibilities of application. The enclosed drawings present a device where the sowing surface during sowing is fed under the sowing device, but also such variants are possible where the sowing device according to the invention is in continuous or discontinuous motion over the sowing surface.

Previously the problem in mechanical sowing was the unability to determine the number of seeds per sowing place. The reason for not being able to do this is that even seeds of the same kind never are similar in size and shape, and that the variations in size often are very great.

The previously known sowing devices with closest resemblance to the present invention comprise a seed transporting device with a plane bottom which is provided with a number of openings smaller than the seeds and corresponding in number and relative position to the sowing places desired. This sowing device is placed above a layer of seeds distributed over a surface corresponding to the bottom of the seed transporting device, in which position the openings are connected e.g., to the suction side of an air compressor, so that the seeds will stick to the mouthes of the openings due to suction. Thereafter the seed transporting device is moved to a position immediately above the sowing surface, and on breaking the connection to the compressor the seeds fall down on the sowing surface. The greatest drawback of these devices is that there is no check whatsoever on how many seeds are obtained per sowing place. Only one seed may suck to some of the openings, but generally a large number of seeds will lump together about each opening, when the compressor starts sucking air into the openings. This type of devices therefore permit control of the sowing places but not of the number of seeds per sowing place, while the seed consumption of the device is usually very high. By this type of devices the seeds are usually sucked to the openings in such a way, that they are lying on edge with their tips directed towards the opening and form a cluster of seeds about each opening. Each such cluster may include quite a large number of seeds. The device according to the present invention is primarily based on specially designed seed lifters intended for mounting to the openings of the seed transporting device in such a manner, that each seed lifter corresponds to one sowing place. The basic construction of the seed lifter includes one suction opening for catching one seed only. The basic idea behind the seed lifters is that if each suction opening is surrounded by a plane field, not much larger than a seed of the type concerned, and if this plane field is restricted by surfaces making an angle with the field and slanting away from it, while the suction opening to be placed in the centre of the field has a diameter so small, that the seed or the main part of it cannot be drawn into the opening, then some of the seeds affected by suction from the suction opening will be more affected than the other seeds in practically all cases on connecting the suction opening of the seed lifter to the suction side of the compressor, due to which this seed will strive to cover the mouth of the entire suction opening, and because the area of the plane field is essentially the same as that of the seed, the seed will cover at least a major part of the field and no suitable counter surface near the suction opening will be available for other seeds affected by the suction from the suction opening, with the result that the other seeds are tipping over the edges of the field. A seed lifter designed along these lines will therefore catch one single seed per suction opening.

The suction opening has a critical diameter which varies with different types of seeds. This ought not permit the possibly pointed ends of a seed type to get sucked into the mouth of the suction opening, because then a cluster of seeds may easily be formed with their points being sucked to the opening to lock together in this position.

If the field about the suction opening is given the right dimension for the seed type concerned, there is no room for more than one seed, although several seeds are affected by the suction from the suction opening.

If several seeds per sowing place is desired, the seed lifter is provided with several suction openings. However, these suction openings are placed at such distance from one another that the fields about each opening are separated from one another by plane or arched surfaces at an angle to the fields and slanting away from each field, the dimension of which surfaces is such that the seeds sucking to the suction openings of each field essentially do not collide. The seed lifters also have to be shaped in such a way, that the sticking seeds do not excessively collide with the bottom of the seed transporting device, on account of which the seed lifters are given the shape of nozzles projecting down below this bottom. By shaping the seed lifters as nozzles projecting down under the bottom of the seed transporting device, the seed lifters can be brought down to one seed layer before connecting the suction side of the compressor. Therefore the seed lifters may be provided with suction openings on both its bottom side and its edge sides.

A seed lifter which has turned out to be very capable of operation has its lower part shaped as a truncate cone, the downwardly directed narrower part of which is ending up in a plane field provided with a central suction opening. The upper larger part of the truncate cone is bounded by the end edge of one cylindric mantle surface, or if the seed lifter is intended for catching several seeds, by that of several curved part-cylinder surfaces limited by plane fields of essentially the same size as the field about the opening in the plane surface of the truncate cone. The fields between the part-cylinder surfaces are also provided with central suction openings. Thus the number of seeds per planting place is determined by the number of suction openings per seed lifter, while the seed lifter type outlined above constitutes a practical construction for preventing the seed from colliding.

In sowing wingless pine seeds the suction openings are found to require a diameter of about 0,3 - 0,4 mm. A diameter as large as 0,5 mm already gives a worse result (several seeds easily sucking fast under formation of clusters), while a 0,7 mm diameter gives a much worse result. In connection with suction openings with a diameter of about 0,4 mm it is found that the fields surrounding them must have a surface of about 3 - 4 mm$^2$.

The critical size of the suction openings and the fields surrounding their mouthes vary with different seed types, but no difficulties in testing suitable dimensions exist. For example, in using the device according to the invention for sowing beat sugar seeds which are relatively large compared to pine-tree seeds, an excellent result could be obtained by seed lifters with a diameter of about 1 mm. Sowing experiments carried out with beat sugar seeds and only one suction opening per seed lifter have with 1 mm diameter suction opening resulted in sowing at 95 percent of all sowing places, which must be considered as a very good result.

The suction openings of seed lifters of the type outlined above may rather easily get clogged up by litter and therefore have to be blown clean by connecting them to the pressure side of the compressor between each sowing operation. If this is done excellent running will be the result.

In checking the sowing result with seed lifters of the above type intended for sowing three seeds per sowing place we have found, that the correct number of seeds is obtained at above 90 percent of all sowing places and that 100 percent of the sowing places received at least one seed.

Figure 2:
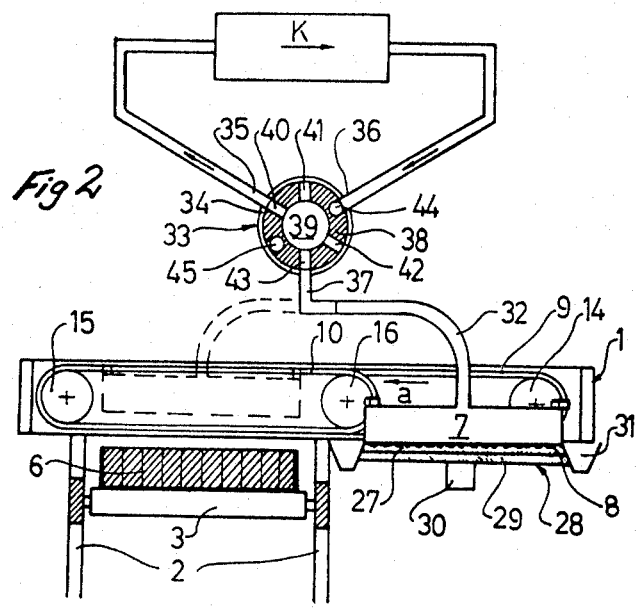
Figures 3, 4:
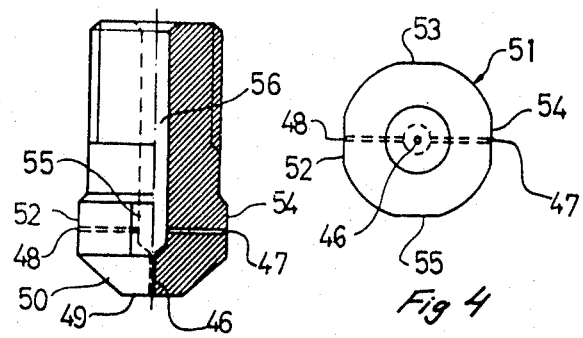

The device according to the invention and defined in the patent claims to follow will be described in full in more detail below in connection with the enclosed drawing, in which FIG. 1 presents from above a sowing machine according to the invention, FIG. 2 presents a section of the same machine taken on the line II—II in FIG. 1, FIG. 3 and 4 present two different projections of a seed lifter or a suction nozzle according to the invention.

Corresponding parts in the different figures have the same symbols.

The sowing machine according to FIGS. 1 and 2 comprises a closed frame member 1. This frame member is rigidly connected above and across a conveyor track 2 provided with rollers 3. Situated on top of the conveyor track are two pot units 5 and 6, the pot unit 5 being in waiting position and the pot unit 6 in sowing position. Suitable stopping points for the different pot units can be accomplished by dropping screens which for clarity are not shown in the figures.

The actual sowing device of the machine comprises a seed transporting device 7, seen in both figures in its first position or seed taking position. In FIG. 2 the seed transporting device is shown with dotted lines also in its second position or sowing position immediately above the pot unit 6. The seed transporting device 7 consists of a suction box, the plane bottom of which is of essentially the same size sideways and lengthwise as the area to be simultaneously sown, i.e., in this case as the horizontal projection of the pot units 5 and 6. The bottom of the seed transporting device 7 is provided with a number of openings corresponding to the number of desired sowing places, i.e., in this case the number of pots in each pot unit 5 and 6. In each one of these openings a seed lifter 8 is arranged, which is provided with one opening per desired seed and sowing place. The seed lifters are presented in detail in FIGS. 3 and 4.

The seed transporting device may be conveniently provided with a detachable bottom and by exchanging different bottoms, easily adapted for a different number of sowing places and different number of seeds per sowing place. By exchanging bottoms provided with seed lifters of different dimensions, one and the same device also may be converted for sowing different types of seeds.

The seed transporting device 7 can be brought from seed taking position to sowing position with the aid of endless chains 9, 10, and 11, 12, running over chain wheels 13, 14, 15, 16, and 17, 18, 19, 20. These wheels are mounted to the frame member 1, so that the chains are running across the feeding track 2. The wheels 13, 15 and 17, 19 are mounted to a common axle 21 rotated e.g., by an electric motor 22. The motor has to have a brake for stopping the seed transporting device at a given position by breaking the current. Each one of the four corners of the seed transporting device 7 is connected by means of link members 23–26 to a link in each one of the four chains 9–12 respectively.

As FIG. 2 indicates, the seed transporting device has two stopping positions determined by limit breakers not shown in the drawings, which are coupled to the motor 22 in such a way, that the current is broken when the seed transporting device has reached its respective stopping positions. In the first position the chain links carrying the link members of the seed transporting device are situated on a level with the axles of the chain wheels, and when the chains by means of the motor 22 are circulated in the direction of the arrow in order to move the seed transporting device 7 to its second position, this device will move upwards during the first part of its movement at the same time as it is shifting towards sowing position. In the corresponding manner the seed transporting device will move downwards during the last part of its movement on being returned to seed taking position. This makes it possible to bring the seed transporting device with its bottom down towards the seed layer 27 which covers the surface of the seed supply 28. Because the bottom of the seed transporting device 7 is brought down towards the upper surface of the seed layer 27, the seed lifters or the nozzles 8 protruding down below the bottom of the seed transporting device will enter into the seed layer. The movement down towards the seed layer makes ideal contact between the seed lifters and the seeds, and at the same time it is possible to furnish the seed lifters with suction openings not only in the lower surface, but also at the sides. In order to facilitate the use also of relatively thin seed layers, the bottom of the seed supply must consist of some elastic compressible material. Therefore the device shown in the figures is provided with a scum rubber mat 29 right under the seed layer 27. To keep the seed layer 27 at even thickness the seed supply must be shaken up between the seed taking operations, because otherwise minute holes will form in the seed layer about the seed lifters. A vibrator is therefore arranged at the bottom of the seed supply. The figure also shows flooding shoots 31 for collecting excess seeds.

The seed transporting device 7 is connected to an air compressor K by way of a flexible hose 32 and a switch valve 33. The valve 33 shown in FIG. 2 consists of a cylindrical valve box 34 provided with a connection 35 to the suction side of the compressor, a connection 36 to the pressure side of the compressor, and a connection 37 to the hose 32. A cylindrical valve body 38 fitted inside of the valve box comprises a central chamber 39, into which four openings 40–43 are leading from the mantle surface of the valve body 38. These openings are situated two by two at a 60° angle to one another, and each opening 40 or 41 in one pair is situated diagonally opposite an opening 42 and 43 respectively in the other pair. Two outlets 44 and 45 right between the openings 41, 42 and 40, 43 respectively are running from the mantle surface of the valve body to the outside of the valve box and connect that one of the connection 35–37 which is brought right before one of these outlets to contact with the surrounding atmosphere. The different connections 35–37 are at 120° angle to one another, and as the openings 40–43 and the outlets 44 and 45 follow one another at 60° angle's distance, the valve 33 is able to accomplish three positions of different functions. In the first position seen in the drawing the suction side of the compressor communicates with the openings of the seed lifters. If the seed transporting device in this position is situated above the seed supply, seeds will be sucked to stick to these openings. In this position of the valve the pressure side of the compressor is leading to the outside of the valve box.

When the valve body 38 is turned 60° clockwise, the pressure side of the compressor is brought to communicate with the openings of the seed lifters, i.e., these are blown clean. It is important, however, that the seeds which loosen as soon as suction disappears are allowed to fall down by their own weight and are not blown off from the seed lifters, because then it is hard to determine beforehand where the seeds will end up. On this account the connection between the compressor and the seed lifters has to be cut off until the seeds have fallen down on the sowing surface, and not before that the suction openings are allowed to be blown clean. During blowing the suction side of the compressor communicates with the atmosphere outside of the valve box. After a further 60° turn of the valve body the suction and pressure sides of the compressor are brought to communicate. If cooling of the compressor is desired, the suction and pressure side respectively may instead be connected to the surrounding atmosphere. The last mentioned valve position is the one that is used when the seed transporting device is returning from sowing position to seed taking position.

FIG. 3 presents on a larger scale a longitudinal partial section of a seed lifter 8. FIG. 4 presents the same seed lifter from below. The seed lifter is intended for catching three seeds and is therefore provided with three nozzle openings 46–48, of which the opening 46 is centrally located in the lower part of the seed lifter, where its mouth is surrounded by a plane field 49 which is limited by mantle surface 50 of the shape of a truncate cone, the top angle of which is about 100°. This mantle surface is limited in its wider part by an essentially cylindrical mantle surface 51 which in the axial direction reaches a distance essentially the same as the diameter of the field 49. The mantle surface 51 has all round oppositely located flattened fields 52–55 in pairs with essentially the same area as the field 49.

In two of these fields, 52 and 54, the other two central openings 47 and 48 are located. These openings have the same diameter as the opening 46. The openings 46, 47 and 48 are leading to a central bore 56 in the interior of the seed lifter. The upper part of the seed lifter is threaded for attachment to the bottom of the seed transporting device.

A seed lifter of the above described type can easily be made for catching 1–5 seeds depending upon the number of openings bored. The plane fields 49 and 52–55 can be made an all seed lifters irrespective of the number of openings to be formed. Because the plane fields are provided both at the lower part of the seed lifter and at its sides, there is no risk that the seeds will collide or that the suction effect from one suction opening will interfere with the suction effect from some other suction opening.

In using the above described device the seed transporting device is moved by means of the motor 22 to seed taking position. When it has reached this position one of the mentioned limit breakers, not shown in the drawings, breaks the current to the motor so that this is immediately stopped by its built in brake. The seed lifters 8 now reach down into the seed layer 27, and when the suction side of the compressor by way of the valve 33 is connected to the seed lifters, one seed will suck to stick to each one of the openings of the seed lifters. Subsequently the seed transporting device is moved to its second position, the sowing position, which is determined by the second limit breaker not shown. During this entire movement the connection to the suction side of the compressor is maintained, and since the seeds now are hanging freely below and at the side of the seed lifters, it is important that the seed transporting device will move smoothly, so that the seeds are not shaking loose from the seed lifters. This is accomplished in a simple manner by the chain operation already mentioned. When the seed transporting device is in its second position, the sowing position, one pot unit 5 or 6 is shifted to sowing position, unless this has not already happened. A stopping device may be expediently provided for localizing the pot units to sowing position. When the pot unit is in sowing position the valve body 38 is turned an angle of 60° clockwise, at which the connection between the seed lifters and the suction side of the compressor is broken and the seeds are falling down to the intended places. When the seeds have fallen down to their predetermined places, the openings of the seed lifters are blown clean and the valve body 38 is turned clockwise a further 60° for the above described blowing, while the seed transporting device is returned to seed catching position. Before it reaches the seed layer 27 this has to be shaken to form an even layer by using a vibrator 30. As soon as the seed transporting device again has reached its first position, a new sowing cycle can begin. The different operations, e.g., starting the motor 22, switching the valve 33, turning on the vibrator 30, and feeding pot units in and out of to their respective places away from sowing position, are easily made automatic to a larger or smaller extent. Construction of suitable steering systems for such automation is a special field in itself and will therefore not be treated further here.

The seed lifters do not have to be arranged on a plane bottom surface as in the example presented, but they can also be mounted to a seed transporting device of the shape of a continuously rotating roller shifting the seed lifters from a seed taking position to a sowing position.

The device according to the invention thus is not restricted to the working example presented, but it can be varied in a number of ways within the scope of the underlying idea of the invention.

I claim:

1. Device for simultaneous mechanical sowing of a number of seeds distributed to a predetermined number of sowing places with a predetermined number of seeds per sowing place, comprising a supply of seeds of the type in question, as well as a seed transporting device which can be moved from a first position immediately at the seed supply to a second position immediately above the surface to be sown, at which the seed transporting device has the same side facing against the seed supply and the surface to be sown, and at which this side is provided with a number of seed lifters, the number and position of which correspond to the number and position of the desired sowing places, at least at part of the surface to be sown, and in addition to which the seed lifters are arranged in such a way, that when the seed transporting device is in its first position immediately at the seed supply, the seed lifters catch the required number of seeds, and when the seed transporting device is moved to its second position, and the seed lifters are immediately above the predetermined sowing places, the seeds detach so that they drop down to the sowing places, characterized in that each one of the seed lifters consists of a suction nozzle, each said suction nozzle having a plurality of spaced openings for each seed desired per sowing place, that the diameters of the openings of the suction nozzles, which openings through the interior of the seed transporting device are switchably connected to the suction side and the pressure side respectively of an air compressor, is considerably less than that of the seed type in question, each one of the suction nozzles comprises a nozzle nipple which is fixed to an opening in the bottom of the seed transporting device and extends down below the bottom and is provided with an axial central opening with its mouth surrounded by a plane field bounded by one or more plane or curved surfaces which form an angle to the field and slope in the direction of the same bottom which plane or curved surfaces have no openings, that the field about the central mouth of the opening is bounded by the end edge at the narrower end of a mantle surface shaped as a truncate cone, which diverges in the direction of the said bottom, that the opposite end edge of the truncate cone-shaped mantle surface is bounded by one end edge of an essentially cylindrical mantle surface, and that the cylindrical mantle surface is divided by one or more plane fields into one or more curved part fields separating the fields from one another, at which these plane fields have essentially the same surface as the plane field about the mouth of the central opening and are in their turn provided with central openings which by way of the interior of the seed lifters communicate with the compressor, the sideway dimension of said plane fields does not essentially surpass the size of the seed type in question, the distance between the different openings in one and the same seed lifter are so chosen and the plane fields are so arranged relative to one another and relatively to the bottom of the seed transporting device, that a seed of the type in question which is resting against the plane field about one of the openings does not contact or collide with the bottom of the seed transporting device, or with seeds resting against the plane fields about the other openings of the seed lifter.

2. Device as claimed in claim 1, characterized in that the seed transporting device has a plane bottom of essentially the same dimension sideways and lengthwise as the surface to be simultaneously sown, that the seed lifters are distributed over this bottom in a manner corresponding to the positions of the desired sowing places relative to one another, that the seed supply is shaped in such a way, that the seeds are essentially equally divided over a plane, preferably yielding or bending support, to form a seed layer covering a surface which essentially corresponds to the bottom surface of the seed transporting device, that the seed transporting device is provided with driving means to bring it with its bottom surface down towards the upper surface of the seed supply when brought to its first position, so that the seed lifters are brought down into the seed layer, that the connections to the compressor are so arranged that the suction side of it can be connected to the openings of the seed lifters when the seed transporting device is in its said first position, so that one seed is sucked to each one of the openings of the seed lifters, that the driving means or the seed transporting device and the connections to the compressor are so arranged that the seed transporting device can be brought over to its said second position with the openings of the seed lifters still connected to the suction side of the compressor to keep the seeds at the seed lifters, that the seed transporting device in its second position is located above a conveyor track of such construction that a prepacked plant box consisting of one single unit or of several units put together can be brought under the seed transporting device with its sowing surface immediately below the bottom surface of the seed transporting device, and that the connection between the compressor and the seed lifters is so arranged that when the plant box has reached a position where the seed lifters are immediately above the desired sowing places, the connections between the seed lifters and the compressor can be broken, so that the seeds fall down to the desired sowing planes.

3. Device as claimed in claim 2, characterized in that for coniferous seeds, preferably wingless pine seeds, the openings of the seed lifters have a diameter of 0.2 − 0.7 mm. preferably about 0.4 mm. and that the plane fields about these openings have a surface of 2 − 4 mm$^2$, preferably about 3 mm$^2$.

* * * * *